T. L. VALERIUS.
BOTTLE FILLER AND CAPPER.
APPLICATION FILED JAN. 4, 1909.
1,072,795.
Patented Sept. 9, 1913.
8 SHEETS—SHEET 1.
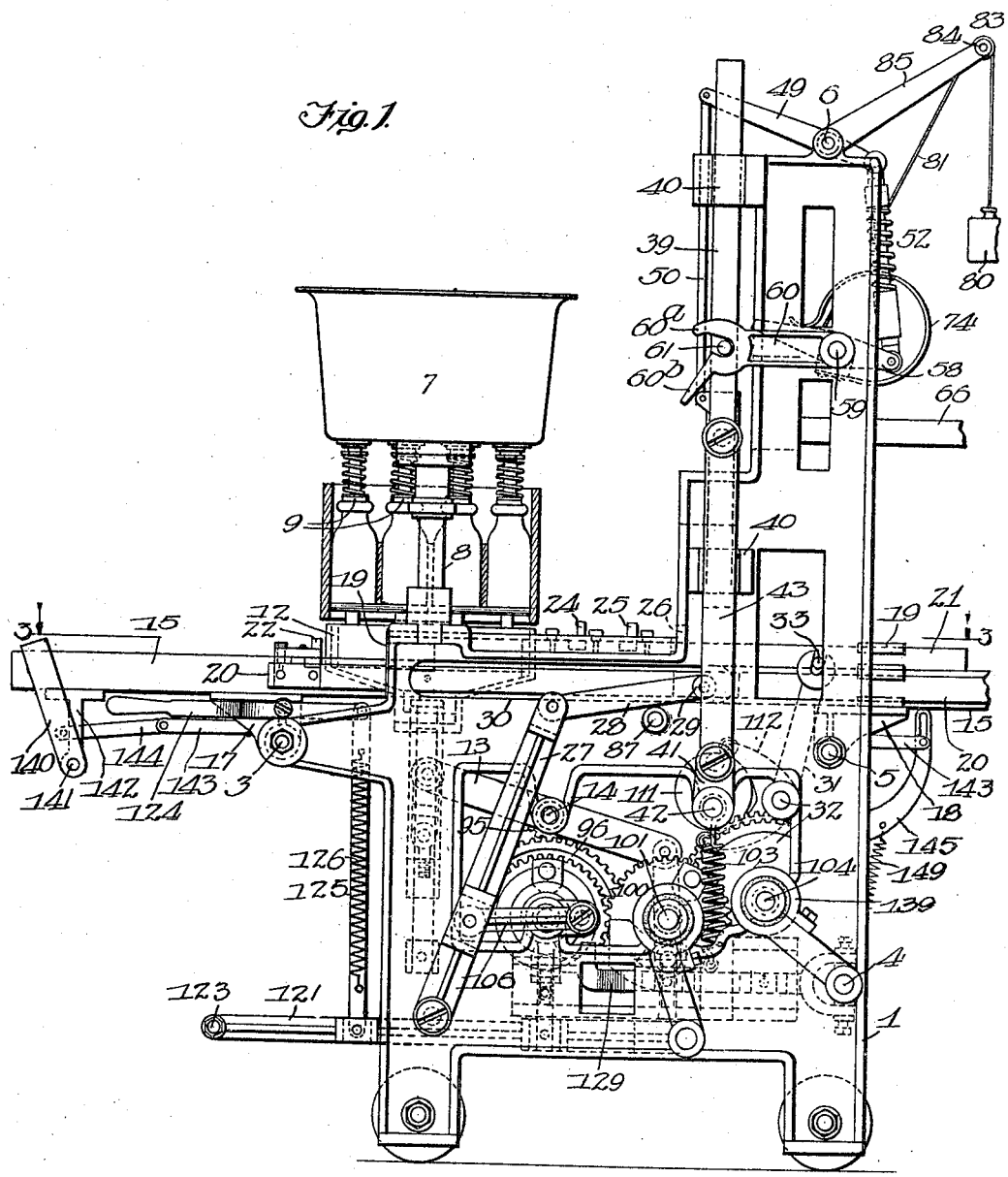

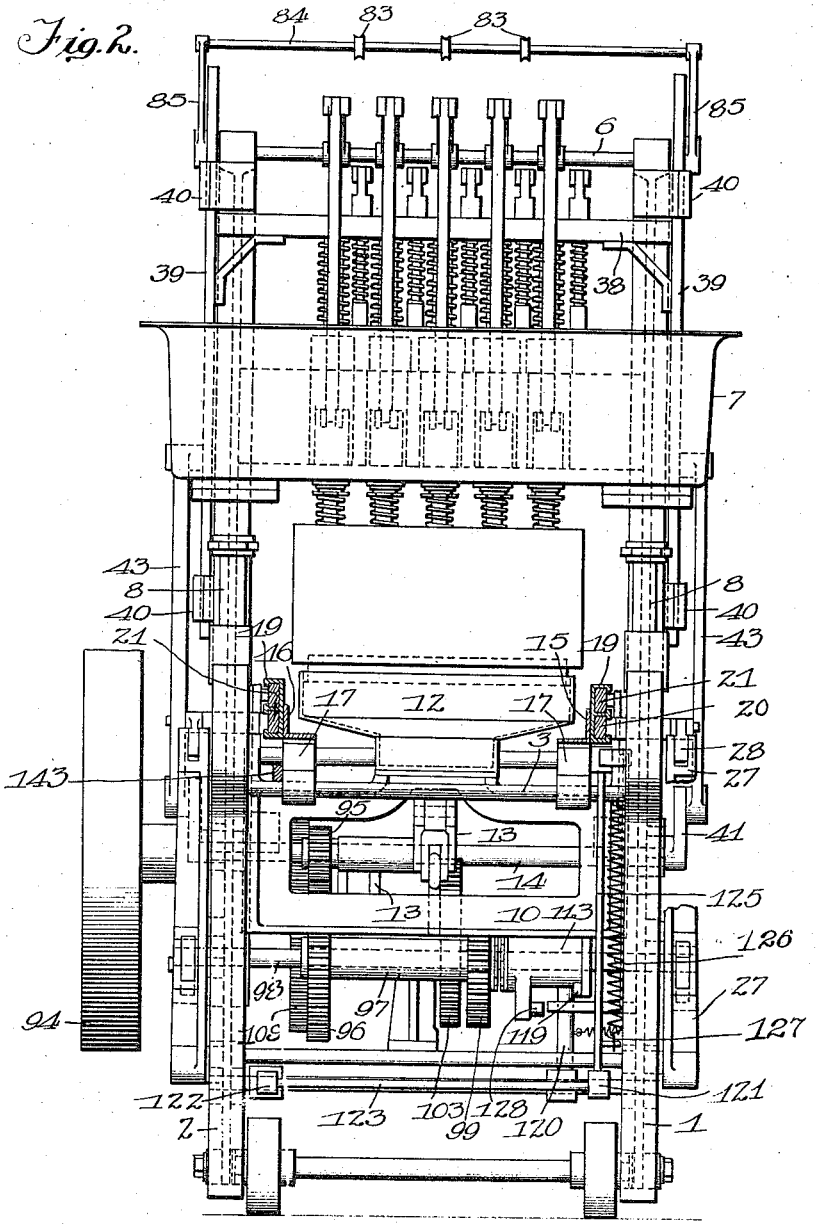

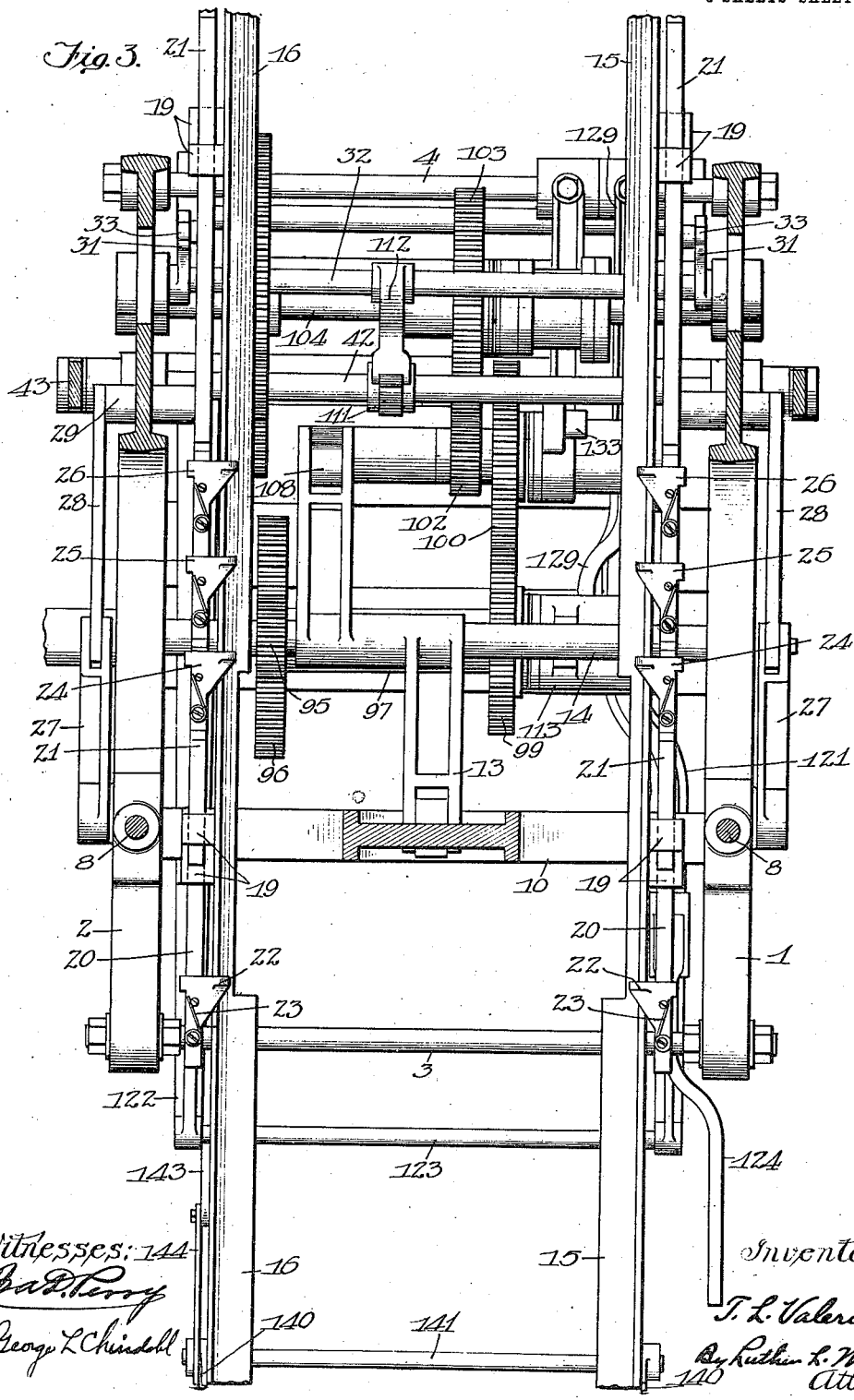

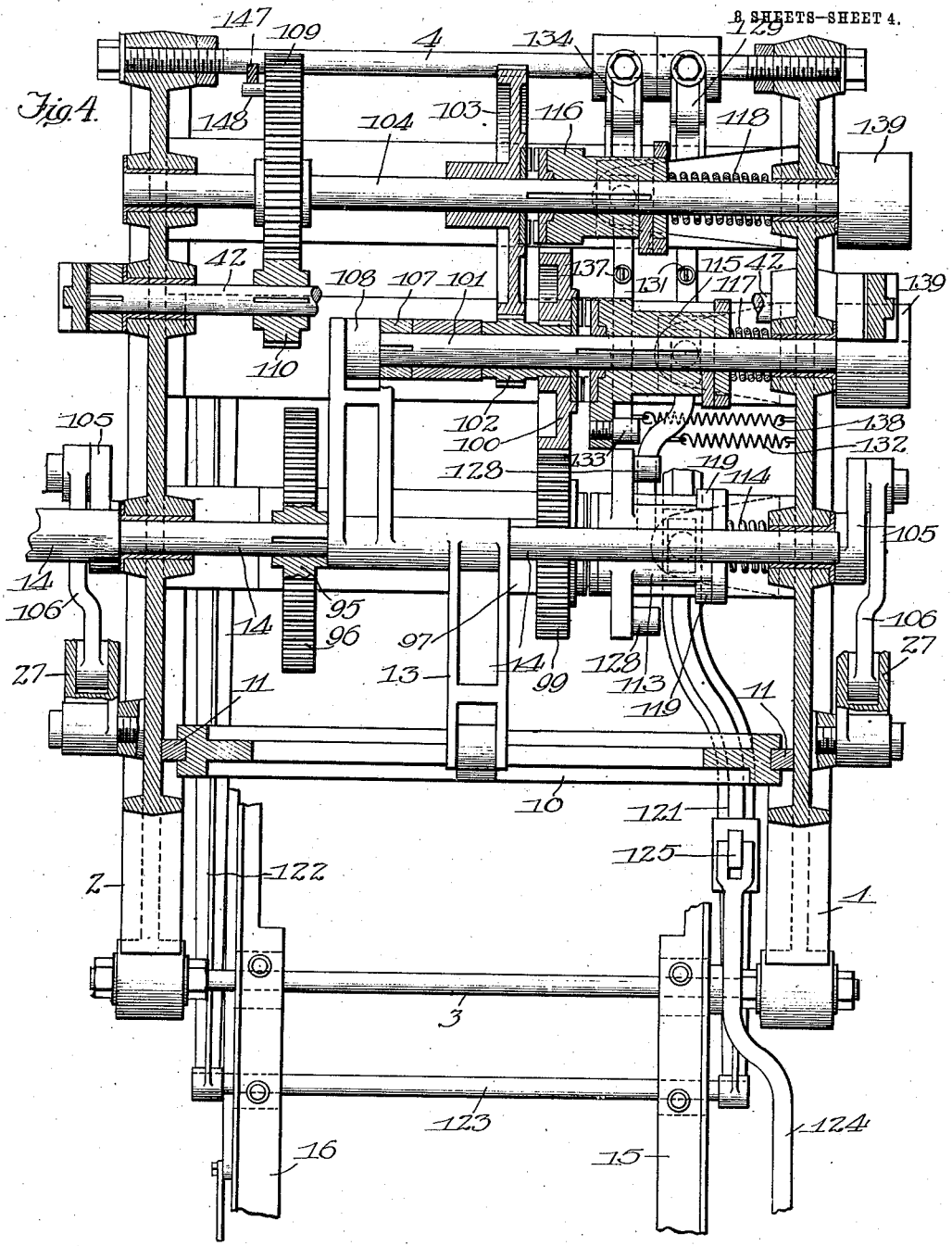

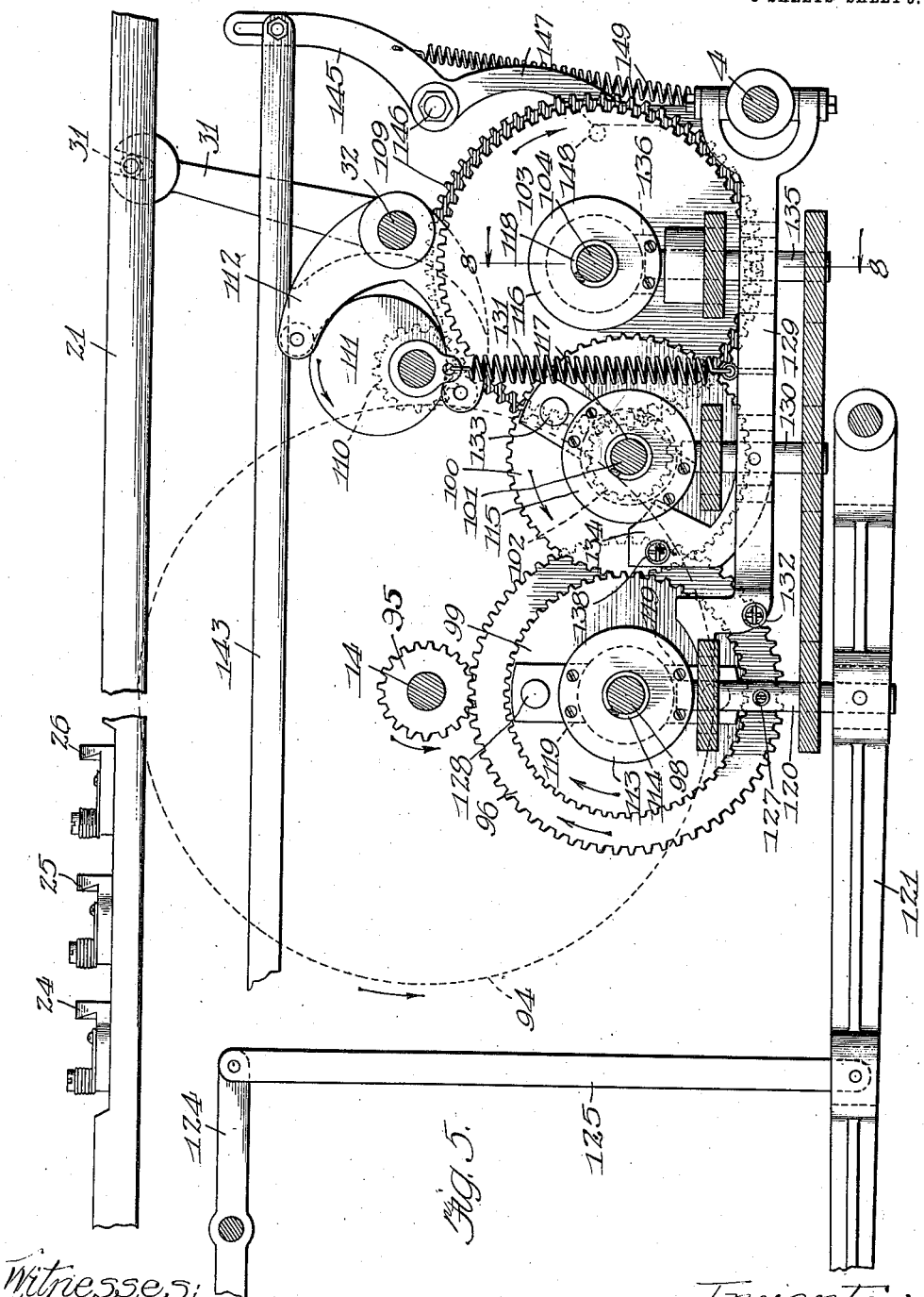

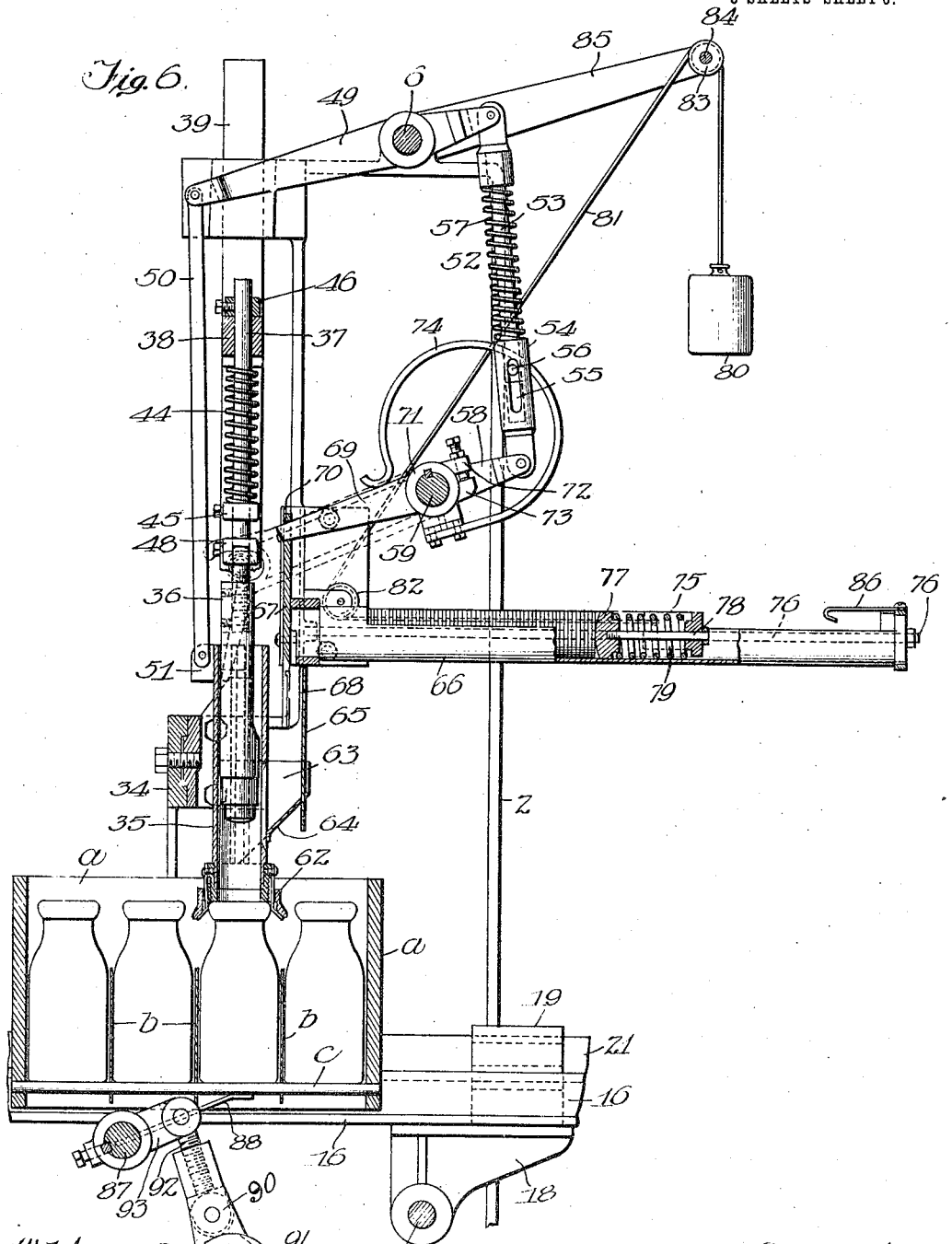

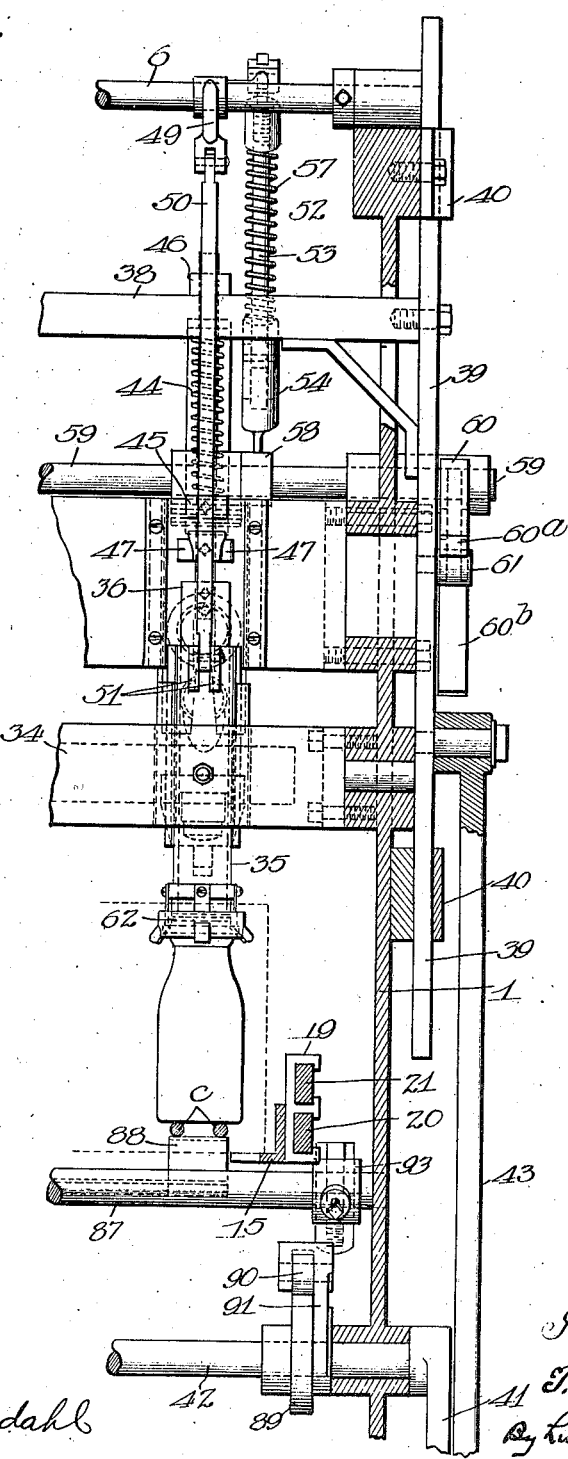

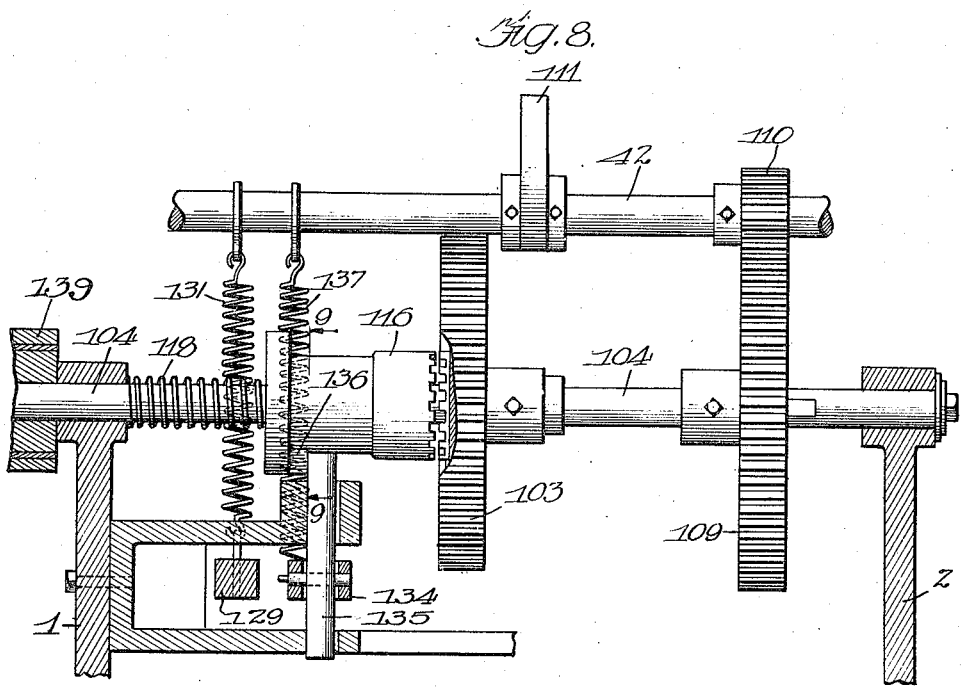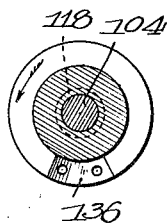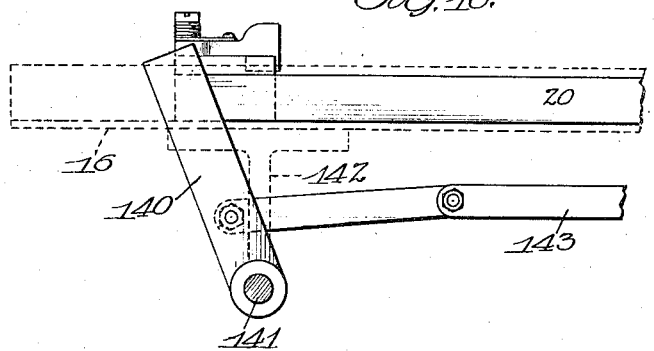

UNITED STATES PATENT OFFICE.

THEODORE L. VALERIUS, OF FORT ATKINSON, WISCONSIN, ASSIGNOR TO CREAMERY PACKAGE MANUFACTURING COMPANY, OF CHICAGO, ILLINOIS, A CORPORATION OF ILLINOIS.

BOTTLE FILLER AND CAPPER.

1,072,795.      Specification of Letters Patent.      Patented Sept. 9, 1913.

Application filed January 4, 1909. Serial No. 470,563.

*To all whom it may concern:*

Be it known that I, THEODORE L. VALERIUS, a citizen of the United States, residing at Fort Atkinson, in the county of Jefferson and State of Wisconsin, have invented certain new and useful Improvements in Bottle Fillers and Cappers, of which the following is a specification.

One of the objects of this invention is to provide a machine for simultaneously filling all of the bottles in a case or crate of bottles.

A further object is to provide a unitary machine capable of filling and stoppering bottles.

As herein shown, the invention is embodied in a machine for filling and capping cased milk bottles.

In the accompanying drawings, Figure 1 is a side elevation, with parts broken away, of a machine embodying the features of my invention. Fig. 2 is a front elevation of said machine, with parts in section. Fig. 3 is a sectional view taken upon the plane of line 3 3 of Fig. 1, with the bottle support omitted. Fig. 4 is an irregular horizontal section through the actuating mechanism. Fig. 5 is a vertical section through the actuating mechanism. Fig. 6 is a sectional view taken upon a vertical plane extending through one of the capping mechanisms. Fig. 7 is a fragmental sectional view showing the mechanism of Fig. 6 in front elevation. Fig. 8 is a sectional detail of the actuating mechanism on line 8 8 of Fig. 5. Fig. 9 is a section on line 9 9 of Fig. 8. Fig. 10 illustrates a means for preventing the feeding forward of a case of bottles when another case is being capped. Fig. 11 is a detail view of a device comprised in a bottle support.

The embodiment herein shown of my invention is designed for filling and capping pint milk bottles set in cases, each case being adapted to hold twenty bottles arranged in four transverse rows of five bottles each. A case of any suitable construction may be used with this machine. The case herein shown (Fig. 6) comprises sides and ends *a*, partitions *b* and rods *c* forming the bottom of the case.

The frame of the machine in this instance comprises two end frames 1 and 2 rigidly secured together by suitable means, such as the cross rods 3, 4, 5 and 6.

At the front of the machine is a stationary tank 7 supported upon posts 8 fixed to and rising from the end frames 1 and 2. The tank 7 carries a plurality of filling valves 9, one for each bottle in the case, said valves being arranged in four transverse rows of five valves each. These valves may be of the construction shown in Patent No. 888,769, issued May 26, 1908, and need not be here described. They are opened to permit milk to flow from the tank 7 to the bottles by raising said bottles into contact with said valves. The means herein shown for raising and lowering the bottle case comprises a slide frame 10 (Fig. 4) mounted upon vertical guide rails 11 fixed to the inner sides of the end frames 1 and 2. To the upper end of the slide frame 10 is fixed a table or framework 12 to support the bottle case. The slide frame 10 is vertically reciprocated by means comprising an arm 13 pivotally supported upon a shaft 14.

Rearwardly of the filling devices is a transverse row of five capping mechanisms. The case of bottles is moved through the machine from the front thereof, to the filling devices and thence to the capping mechanisms upon a track herein shown as consisting of two angle bars 15 and 16, said bars being fixed to the brackets 17 and 18 carried by the cross rods 3 and 5. Said track extends far enough in front of the filling mechanism to support a case of empty bottles placed thereon by the operator. Fixed to the outer ends of the angle bars 15 and 16 are guides 19 for slide bars 20 and 21. The slide bars 20 carry at their forward ends pivoted dogs 22 (Figs. 1 and 3) that are yieldingly held by springs 23 in position to engage a bottle case placed upon the track by the operator. When the slide bars 20 are moved rearwardly, the dogs 22 push said bottle case into place beneath the tank 7, said bottle case pushing before it the previously filled bottle case, rearwardly far enough to bring the rearmost transverse row of bottles in said filled case directly beneath the row of capping devices. The slide bars 21 are provided to move the filled bottle case rearwardly step by step to bring the rows of bottles in said case successively into position for the capping operation. Each of said slide bars 21 carries three spring-pressed yieldable dogs 24, 25 and 26 which engage the filled bottle case in the order named. The slide bars 20 are reciprocated by means comprising two levers 27 pivotally supported upon the end frames 1 and 2 and connected with the slide bars by means of links 28 pivoted to studs 29 on said slide bars. The end frames 1 and 2 are slotted, as at 30 (Fig. 1) to accommodate the studs 29. Each of the slide bars 21 is reciprocated by means of an arm 31 pivotally mounted upon a shaft 32, the upper end of said arm being forked to receive a pin 33 on the slide bar.

As herein shown, the capping devices are similar, in a general way, to those described in Patent No. 888,770, issued May 26, 1908. Referring to Figs. 6 and 7: A frame member 34 slidably supports a row of vertically extending tubular shells or plunger guides 35 in each of which is mounted a vertically reciprocatory plunger 36. Each of the plungers 36 is provided with an upwardly extending stem 37 which passes loosely through a transverse drive-head 38. The drive-head 38 is carried by a pair of vertically reciprocatory bars 39 guided in guide pieces 40. The bars 39 are reciprocated by means of crank arms 41 fixed on the ends of a rotary shaft 42, links 43 connecting said crank arms with the bars 39. The downward stroke of the drive-head 38 is in excess of the downward stroke of the plungers 36, the plunger stems 37 being yieldingly connected to the drive-head 38 by means of coiled springs 44 encircling the stems 37 and interposed between said drive-head and collars 45 fixed on the plunger stems.

46 are collars fixed to the plunger stems 37 above the drive-head 38.

At the end of their downward movement, the plunger stems 37 are stopped by the engagement of lugs 47 carried by collars 48 fixed on said stems, with the upper ends of the plunger guides 35. The plunger guides 35 are depressed by suitable mechanism upon the mouths of the bottles just in advance of the descent of the plungers 36. When the plungers ascend the plunger guides are raised, thereby permitting the movement of the bottle case to place the next transverse row of bottles in line with the capping mechanism. A means for thus actuating the plunger guides will now be described.

The cross rod or shaft 6 serves as a fulcrum for a series of levers 49, said levers being connected respectively to depending rods 50 which are pivotally connected at their lower ends to lugs 51 projecting from the plunger guides 35. Pivotally connected with the opposite end of each lever 49 is a telescopic connecting rod 52 comprising a rod 53 and a sleeve 54, the latter being provided with a slot 55 to receive a pin 56 projecting from the rod 53. Between the sleeve 54 and a shoulder on the rod 53 is a compression spring 57 which normally holds the telescopic connecting rod 52 extended to its greatest length.

The lower end of each telescopic connecting rod 52 is pivotally connected to an arm 58 fixed upon a transverse rock shaft 59. To each end of the rock shaft 59 is fixed a cam arm 60 (Fig. 1), the outer end of which cam arm is bifurcated, forming an upper portion 60$^a$ and a lower longer portion 60$^b$. Each slide bar 39 carries a projection 61 which engages in the recess between the portions 60$^a$ and 60$^b$. The downward movement of said slide bars 39 causes the projection 61 to rock the cam arms 60 and thereby rock the shaft 59. This movement of the shaft 59 elevates the series of rock arms 58 and causes the plunger guides 35 to be depressed onto the mouths of the bottles. The lower end of each plunger guide is provided with a bottle-registering device 62 (described in detail in Patent No. 888,770 hereinbefore mentioned) which, when the plunger guide is approaching the end of its downward stroke, impinges upon the mouth of the bottle and automatically moves the bottle into concentric position with the plunger guide and the plunger, should the bottle be slightly out of proper position. The downward movement of the plunger guide is arrested by the bottle.

As shown in Fig. 6, a portion of the rear wall of the plunger guide 35 is cut away, and the sides thereof are extended rearwardly in the portions 63 and connected by an inclined plate 64. The sides 63 and the plate 64 form a chute through which caps are delivered into the guide. A stationary vertically extending back plate 65 is secured close to the back of the chute and passes through a slot in the bottom thereof.

The cap magazines 66, one for each of the plungers 36, are secured in horizontal position in the frame of the machine. An ejector slide 67 is mounted to traverse the front end of each magazine. The inner face of the slide 67 is provided with a recess 68, the width of which is equal to or slightly more than the diameter of a cap, and the depth of which is approximately equal to the thickness of one cap. The ejector slides 67 are reciprocated by means of rock arms 69, the hubs of which are rotatably mounted on the rock shaft 59. The free end of each arm 69 engages in an opening 70 in one of the ejector slides 67. A collar 71 fixed on the shaft 59 carries a projection 72 that overlies a rearward extension 73 on the rock arm 69. Attached to the collars 71 are springs 74 through which the initial rocking movements of the shaft 59 are transmitted to the rock arms 69 to cause the downward strokes of the ejector slides 67. Said ejector slides are positively elevated by the action of the members 72 upon the extensions 73.

Each of the cap magazines 66 is in the form of a tube, with its upper portion cut away. The caps are fed through the magazine by means comprising a follower 75 which is movable longitudinally of the magazine upon rods 76 fixed with relation to said magazine.

77 is a block having a stem 78 slidably mounted in the follower 75, a coiled spring 79 yieldingly holding the block 77 against the rear end of the stick of caps.

The follower 75 is moved by suitable means, such as a weight 80 attached to a cord 81 fixed to the carriage and extending over guide sheaves 82 and 83, the latter sheave being mounted upon a shaft 84 that is carried by arms 85 fixed to the cross rod 6. A spring hook 86 fixed to the rear end of the magazine may be employed to hold the follower 75 in inoperative position.

In order to afford additional support for the bottles during the capping operation and thereby prevent straining or excessive springing of the bars c, I provide suitable means, as, for example, a rock shaft 87 mounted in the supporting frame and having fixed thereto five spring fingers 88 (Figs. 5, 6 and 11) adapted to underlie the bottle case directly beneath the row of bottles being capped, and support said bottles when the caps are driven into the mouths thereof. The shaft 87 is rocked to raise the spring arms 88 by means herein shown as comprising a cam 89 fixed upon the shaft 42 and engaging a roller 90 carried by a fork 91, said fork slidably embracing the shaft 42 and being adjustably connected by a screw rod 92 to an arm 93 fixed to the rock shaft 87.

The mechanism for causing the filling mechanism, the capping mechanism and the case-moving mechanism to perform their functions automatically and coöperatively will now be described.

The shaft 14 is provided with a drive pulley 94 and constitutes the drive shaft of the machine. Fixed upon said shaft is a pinion 95 meshing with the spur gear wheel 96, which is fixed upon a sleeve 97 that is rotatably mounted on a shaft 98. Rigidly attached to said sleeve is a gear wheel 99 that meshes with a gear wheel 100 rotatably carried by a shaft 101. A pinion 102 is rigidly attached to the gear wheel 100 and engages a spur gear 103 loose on a shaft 104. When the machine is in use the drive shaft 14 and the gears 95, 96, 99, 100, 102 and 103 are continuously driven, but the shafts 98, 101 and 104 are rotated only while the operations of filling and capping are actually taking place. The shaft 98 actuates the case-moving slides 20, the shaft 101 raises and lowers the table 12, while the shaft 104 actuates the case-moving slides 21, the capping mechanism, the bottle-supporting means 88, and a safety device to be hereinafter described.

Upon opposite ends of the shaft 98 are fixed crank arms 105 (Fig. 4) which are connected to the levers 27 by connecting rods 106.

On the inner end of the shaft 101 is a crank arm 107 (Fig. 4) that is connected by a link 108 to one end of the lever 13.

A spur gear wheel 109 (Figs. 4, 5 and 8) is fixed to the shaft 104 and meshes with a pinion 110 fast on the shaft 42. Fixed on the shaft 42 is a cam or eccentric 111 which engages a yoke 112 fixed on the rock shaft 32. Upon the shaft 98 is slidably but non-rotatably mounted a clutch member 113 (Figs. 2, 4 and 5) having upon one end clutch teeth adapted to engage similar teeth formed upon the gear 99. A spring 114 tends to move the member 113 into clutch connection with said gear wheel. Similar clutch members 115 and 116, provided with springs 117 and 118, are mounted upon the shafts 101 and 104 and arranged to engage the gear wheels 100 and 103, respectively. The clutch member 113 is moved out of operative position and normally held in such position by means comprising two diametrically opposite cam blocks 119 fixed on said clutch member and arranged to ride up on a clutch pin 120, said clutch pin being slidably mounted in the framework of the machine and being connected to an operating lever 121 which is pivoted in the machine frame. A similar lever 122 at the opposite side of the machine is connected to the lever 121 by a rod 123 to form a treadle. Said treadle is connected to a hand lever 124 by a link 125. A spring 126 tends to hold the clutch pin 120 in the position shown in Fig. 5. When the pin 120 is momentarily withdrawn from engagement with a cam block 119, the spring 114 slides the clutch member 113 into engagement with the rotating gear wheel 99, whereupon the shaft 98 and the clutch member 113 are rotated until a cam block 119 engages the clutch pin 120. As the cam block rides up on the pin the clutch member 113 is slid, against the pressure of the spring 114, out of clutch with the gear 99. A spring 127, somewhat stronger than the spring 114, tends to move the pin 120 laterally in its bearings. Said spring 127, supplementing the action of the cam blocks 119, moves the clutch member 113 slightly to free the clutch teeth on said clutch member from the clutch teeth on the gear wheel. The openings through which the pin 120 extends are somewhat larger than the pin, in order to permit of a slight sidewise movement of the latter.

The shaft 98, in its rotation, sets the shaft 101 to rotating, and the latter starts the shaft 104. Upon the clutch member 113 are two diametrically opposite studs 128 arranged to engage and depress a lever 129, said lever being swiveled upon the cross-rod 4 to swing vertically and horizontally. Attached to the lever 129 is a clutch pin 130 vertically slidable in the machine frame and arranged to be engaged by two diametrically opposite cam blocks on the clutch member 115 similar to the blocks 119. A spring 131 tends to hold said clutch pin in operative position. A spring 132 attached to the lever 129 serves a purpose similar to that of the spring 127.

133 is a stud on the clutch member 115 arranged to engage a lever 134 swiveled on the rod 4, said lever operating a clutch pin 135 adapted to be engaged by a cam block 136 on the clutch member 116 similar to the blocks 119. The clutch pin 135 is normally held in operative position by a spring 137. 138 is a spring serving the same purpose as the springs 127 and 132.

Any suitable means may be provided for preventing the shafts 98, 101 and 104 from rotating by momentum. The drawings show friction brakes 139 for the shafts 101 and 104.

In Fig. 1 the mechanism is shown at rest, a case of bottles having been elevated into filling position, the valves being open and milk flowing into the bottles. While the bottles are filling the operator sets a case of empty bottles on the angle tracks 15 in front of the case being operated upon. When the bottles in the elevated case are full, the operator lifts the hand lever 124, thereby withdrawing the clutch pin 120 from engagement with the clutch member 113. The shaft 98 is now rotated through half a revolution to move the case-slides 20 into initial position, that is to say, toward the left, Fig. 1. In the rotation of said shaft, one of the studs 128 engages the lever 129 and thereby clutches the shaft 101 to the gear wheel 100, whereupon said shaft is rotated through a half revolution, lowering the case of filled bottles. The operator then operates the lever 124 to set the shaft 98 in rotation, the resulting movement of the slides 20 pushing the case of empty bottles onto the table 12 and said case pushing before it the case of filled bottles to bring the rearmost transverse row of bottles into position beneath the capping mechanism. By the time the case of empty bottles is on the table 12, one of the studs 128 has engaged the lever 129, thereby causing the shaft 101 to be rotated through a half-revolution to lift said case into filling position. The shaft 104 meantime having been clutched to the gear wheel 103 through the action of the stud 133 upon the lever 134, the capping mechanism is actuated to cap the four rows of bottles in the filled case successively, the slides 21 being reciprocated three times to feed the case rearwardly step by step. A case of empty bottles having been set upon the tracks 15, the elevated case is lowered when the bottles therein are filled, by lifting the hand lever 124, and the cycle of operation repeated.

It will be understood that the rate of flow of the milk varies with temperature and other conditions. The operator is enabled to keep the case elevated as long as may be necessary to fill the bottles and may also lower the bottles whenever desirable from any cause, as, for example, the discovery of a defect in the bottles.

In order to render it impossible to advance a case of bottles toward the capping mechanism, while the bottles in another case are being capped, I provide arms 140 (Figs. 1, 3 and 10) fixed upon the ends of a rock shaft 141 carried in brackets 142 fixed to the angle tracks 15, said arms being arranged to be swung into position alongside the dogs 22 to hold said dogs out of position to engage a bottle case. The arms 140 are operated by means such as a slide bar 143 suitably supported in the machine frame and connected at its forward end with an arm 140 by means of a link 144 and attached at its rear end to an arm 145 (Fig. 5) pivotally supported at 146 in the supporting frame. Rigid with the arm 145 is an arm 147 arranged to be engaged by a pin 148 upon one side of the spur gear 109. As soon as said spur gear wheel is set in rotation (which occurs with the commencement of the capping operation) the pin 148 runs off the end of the arm 147, whereupon a spring 149 rocks the arm 145 to swing the arms 140 into guarding position, that is to say, into position to hold the dogs 22 retracted. If, now, the operator should inadvertently lift the lever 124, thus actuating the slides 20, said slides would be unable to engage and move a case. Simultaneously with the completion of the capping operation the pin 148 engages the arm 147, thereby throwing the arms 140 into the position shown in Fig. 1.

Cased quart bottles are ordinary arranged in three transverse rows of four bottles each. It will therefore be seen that a machine for filling and capping quart bottles will differ from the machine herein shown principally in the number of filling valves and capping devices, the shaft 42 being rotated three times to each rotation of the shaft 104, instead of four times, as herein shown.

Various changes may be made in the construction and arrangement of the mechanism herein shown. I, therefore, desire not to be limited to the details set forth.

I claim as my invention:

1. In a cased-bottle filler, in combination, filling means; case-moving means; and means controlled by said case-moving means for inaugurating the filling operation.

2. A unitary cased-bottle filler and capper comprising means for simultaneously filling the bottles in a case containing rows of bottles, and means for successively capping rows of bottles in the case.

3. A unitary cased-bottle filler and capper comprising a filling means, a capping mechanism, a mechanism arranged to actuate the capping mechanism a predetermined number of times, and a mechanism arranged to impart single actuations to the filling means, said actuating mechanisms being operatively connected together.

4. A bottle filling and capping machine comprising a filling means, a capping means, a bottle-moving means, means for actuating the filling means, means for actuating the capping means, and means for actuating the bottle-moving means, the means for actuating the bottle-moving means being arranged to operate the filler actuating means, and the latter being arranged to operate the capper actuating means.

5. In a cased-bottle filler, in combination, filling means; a case support; means for raising and lowering one of said instrumentalities; a clutch for throwing out said raising and lowering means upon the completion of every ascent or descent; and means for operating said clutch.

6. In a bottle filler, in combination, filling means; case-supporting means, one of said instrumentalities being fixed and the other being movable toward and away from the fixed instrumentality; and means for moving the movable instrumentality, said means comprising a shaft, means for driving said shaft, and means for disconnecting said shaft from its driving means upon the completion of a half revolution of the shaft.

7. In a cased-bottle filler, in combination, filling means; a case support; means for raising and lowering one of said instrumentalities; means for moving a case onto said case support; a clutch for throwing out said raising and lowering means upon the completion of every ascent or descent; and means actuated by said case-moving means for operating said clutch.

8. In a cased-bottle filler, in combination, filling means; a case support; means for raising and lowering one of said instrumentalities; reciprocatory means for moving a case onto said case support; a clutch for throwing said reciprocatory means out of operation upon the completion of a movement in either direction; means for operating said clutch; and means actuated by said case-moving means for placing said raising and lowering means in operation.

9. In a cased-bottle filler and capper, in combination, means for simultaneously filling all the bottles in a case containing rows of bottles; capping mechanism arranged to cap in succession the rows of bottles in the case; and means for moving a case from the filling mechanism to and past the capping mechanism.

10. In a cased-bottle filler and capper; in combination, filling means; a case support; means for raising and lowering one of said instrumentalities; means for moving a case onto said case support; a clutch controlling the operation of said raising and lowering means; means actuated by said case-moving means for operating said clutch; capping means; means for advancing a case to said capping means; a clutch controlling the operation of said capping means and case-advancing means; and means actuated by the raising and lowering means for operating the last mentioned clutch.

11. In a cased-bottle filler and capper, in combination, a track for bottle cases; filling means for simultaneously filling all the bottles of a case and cap-applying means located at different points along said track; means for moving a case of empty bottles along said track to said filling means; and means for intermittently moving a case of filled bottles along said track to bring the bottles therein into operative relation with the cap-applying means.

12. In a cased-bottle filler and capper, in combination, a track for bottle cases; filling means for simultaneously filling all the bottles of a case and cap-applying means located at different points along said track; means for moving a case of empty bottles along said track to said filling means; and means for intermittently moving a case of filled bottles along said track to bring the bottles therein into operative relation with the cap-applying means, the case of empty bottles pushing the case of filled bottles within reach of the intermittent moving means.

13. In a cased-bottle filler, in combination, a plurality of filling valves; a case-supporting table guided for vertical reciprocation; a lever connected at one end with said table; a shaft having a crank connection with the other end of said lever; means for driving said shaft; and means for disconnecting said shaft from its driving means upon the completion of a half-revolution of the shaft.

14. In a cased bottle filler and capper, in combination, a track for cases; a stationary set of filler valves and a row of capping mechanisms located at different points along said track and between the ends thereof; a vertically reciprocable case-supporting table below said valves, the line of movement of said table crossing said track; a slide adapted to engage a case and move it along the track; a slide having a plurality of devices adapted to engage a case successively and move it along the track to bring successive rows of bottles into capping position, the first mentioned slide being arranged to move a case within reach of the second mentioned slide; auxiliary bottle supporting means; means for actuating the first mentioned slide; means for actuating the table; and means for actuating the capping mechanisms, the second mentioned slide and the auxiliary bottle supports, the first mentioned actuating means being arranged to operate the table-actuating means, and the latter being arranged to actuate the third-mentioned actuating means.

15. In a bottle filler, in combination, bottle-filling means; a slide for feeding bottle cases with relation to said filling means; case-engaging means on said slide; and means for operating said case-engaging means to render said case-engaging means inoperative.

16. In a bottle filler, in combination, bottle-filling means; a reciprocatory slide for moving a case to and away from said filling means, said slide having a yieldable case-engaging dog; a member pivoted in position to press said dog out of operative position when the slide is in a certain position; and means for moving said member into and out of operative position.

17. In a bottle filler, in combination, an elevated tank provided with filling valves; a track extending horizontally beneath said tank; a slide guided for movement alongside said track; a pivoted spring-pressed dog mounted on said slide in position to engage a bottle case supported upon said track; means for reciprocating said slide; a member supported near one end of the travel of said slide; and means for moving said member into and out of the path of said pivoted dog.

18. In a bottle filler and capper, in combination, bottle-filling means; bottle-capping means; a reciprocatory slide for moving a case to and away from said filling means, said slide having a yieldable case-engaging dog; a movable member located in position to press said dog out of operative position when the slide is in a certain position; and means actuated by the capping means for moving said member into and out of operative position.

19. In a bottle filler and capper, in combination, bottle-filling means; bottle-capping means; means for moving a case to and away from said filling means; a member adapted to render said moving means inoperative; a pivoted member connected to said first mentioned member; means for actuating said capping means, said actuating means comprising a movable member carrying a pin adapted to engage said pivoted member, said pin being movable out of engagement with said pivoted member upon movement of said movable member; and a spring for swinging said pivoted member when said pin has moved out of engagement with said pivoted member.

THEODORE L. VALERIUS.

Witnesses:
 ROBERT B. CORNISH,
 ARTHUR HUNTRESS.